June 20, 1961  A. C. PITCHFORD  2,989,494
METHOD FOR INCORPORATING RUBBER LATEX IN ASPHALT
Filed Aug. 14, 1957
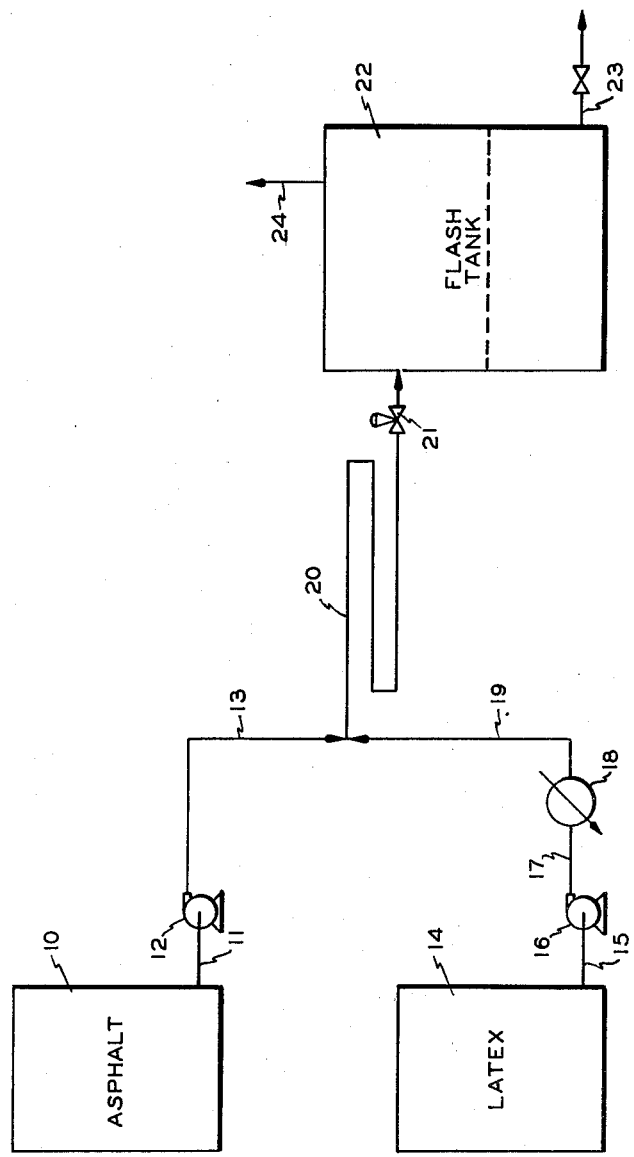
INVENTOR.
A. C. PITCHFORD
BY Hudson & Young
ATTORNEYS

2,989,494
METHOD FOR INCORPORATING RUBBER LATEX IN ASPHALT

Armin C. Pitchford, McGregor, Tex., assignor to Phillips Petroleum Company, a corporation of Delaware
Filed Aug. 14, 1957, Ser. No. 678,063
14 Claims. (Cl. 260—28.5)

This invention relates to a method for incorporating rubber latex into asphalt. In one aspect, the invention relates to a method of mixing finely divided rubber with asphalt by a method involving blending latex rubber and asphalt under pressure.

Rubber in minor amounts is added to asphalt for paving purposes to increase its ductility and to reduce its susceptibility to temperature changes. In order to obtain the maximum benefit the rubber should be finely divided and well dispersed in the asphalt. For such a purpose, latex rubber is an ideal starting material and has been added to hot bitumen and to asphalt for paving during the mixing process. Prior art processes for producing asphalt-rubber blends using rubber latex as the source of the rubber have encountered the major difficulty of excessive foaming during the process of hot mixing the two materials. The foaming creates a handling problem and makes it very difficult to obtain proper mixing. In prior art processes, when latex rubber is added directly to hot bitumen or asphalt, for instance, at a temperature of 150° C., there is a sudden evolution of steam with consequent foaming which is very difficult to prevent, although some control can be obtained by stirring sufficiently during the addition. Mixing solid rubber, on the other hand, is a very difficult process in that good dispersion of the rubber in the asphalt is exceedingly difficult. Thus, it is seen that a process for forming asphalt-rubber blends from asphalt and rubber latex is quite desirable.

An object of the invention is to provide a method for the incorporation of latex rubber into hot asphalt whereby foaming difficulties are avoided and the properties of the asphalt-rubber blend are improved. Other objects, as well as aspects and advantages, of the invention will be apparent from a study of the accompanying disclosure.

According to the invention, there is provided a process which comprises forming a hot mixture of asphalt and rubber latex at a temperature substantially above the normal boiling point of water under a pressure sufficient to maintain the water in liquid phase, reducing the pressure of the hot mixture and thereby vaporizing the water and removing said vaporized water from said mixture, leaving an asphalt-rubber blend. The process can be effected on a batch basis, employing only one vessel, or it can be effected on a continuous basis by forming the hot mixture in one zone, and subsequently discharging the hot mixtures to a zone of lower pressure to effect vaporization of water. Preferably, the hot mixture is discharged into a zone of lower pressure above the level of already formed asphalt-rubber blend, rather than beneath the level of the blend.

I have discovered that, following the steps of my invention, the rubber-asphalt mixture can be rapidly formed and the water vaporized therefrom in the pressure reduction step at maximum possible rates without encountering foaming.

It has been found that the process of the invention is applicable to any type of latex rubber. Natural rubber latices, butadiene-styrene latices, such as GR–S latices, polybutadiene latices, butadiene-acrylonitrile latices, butadiene-2-methyl-5-vinylpyridine latices, and polyisoprene latices are representative examples. Butadiene-styrene latices containing 15–30 weight percent styrene and polybutadiene latices are particularly useful. The latices employed usually contain 5 to 50, preferably 8 to 35 weight percent rubber solids, although higher or lower concentrations are applicable.

The products produced according to the process of the invention are useful as road paving materials, expansion joint sealants, and playground surfacings, among other uses.

Although I do not know the precise reason for which my process avoids the foaming trouble encountered in prior art processes, it is noted that the vaporization of water from my asphalt-rubber blends is effected by flash vaporization, in contrast to the prior art blending methods.

The drawing is a schematic representation of an embodiment of this invention. Hot asphalt is withdrawn from tank 10 through conduit 11 by pump 12 and discharged to line 13. Rubber latex is withdrawn from tank 14 through line 15 by pump 16 and passed through line 17 to heat exchanger 18, where the temperature of the latex is raised to the desired point. The hot latex is conducted through line 19 to join the hot asphalt stream conducted through line 13 and the two streams are passed to mixing zone 20, in this case, simply a length of pipe. Mixing zone 20 can comprise a length of pipe, for example, in the form of a coil, and can be in a heating means, not shown, so that the temperature of the mixture can be raised to the desired point or maintained at the desired level if it enters the mixing zone at this desired temperature. The latex and asphalt following mixing in pipe 20 are discharged through valve 21 to flash tank 22. The pressure in the system downstream of pumps 12 and 16 and upstream from valve 21 is maintained above the vaporization pressure of water at the maximum temperature in this portion of the system. Thus, the mixing in zone 20 is substantially in the liquid phase. The temperature in zone 20 is ordinarily maintained in the range of 250 to 400° F., preferably in the range of 300 to 350° F. Mixing zone 20 can merely be a length of pipe, as shown in the drawing, or it can be any suitable means of mixing two materials, such as a stirred vessel, a pipe containing an orifice mixer, a venturi mixer, or a pipe containing a centrifugal pump in which mixing is effected, or other conventional mixing means.

The pressure in flash tank 22 is maintained sufficiently low, ordinarily atmospheric, to allow the water in the asphalt-rubber latex mixture to flash vaporize and be removed as steam through line 24. An asphalt-rubber mixture accumulates in the bottom of flash tank 22 and is removed for use through line 23.

Numerous modifications of the specific embodiment above-described will be readily apparent to those skilled in the art. For example, the asphalt in tank 10 can be maintained at a temperature below the desired temperature in line 20, for example, only sufficiently high to allow pumping, and the temperature adjusted following pump 12 by inclusion of a heat exchanger in line 13 or by heating in line 20. In another modification, the asphalt can be used above the desired temperature to be maintained in mixing line 20 and the excess heat available used to heat the latex added by line 19, thus obviating the necessity for heat exchanger 18.

The amount of rubber contained in the asphalt-rubber blend will depend upon its final use. For example, paving blends are ordinarily made up to contain from 1 to 5 weight percent rubber in the blend. Other materials, for example, sealing compositions for expansion joints and other similar uses, sometimes contain as much as 15 percent or more rubber. Surfacings for playgrounds can contain anywhere from one to 20 weight percent rubber. The invention is ordinarily employed to incorporate up to 20 weight percent rubber in asphalt.

EXAMPLE I

The rubber employed in the preparation of the pressure blended asphalt-rubber mixture according to the process of the invention, was prepared employing the following recipe:

Recipe

| | |
|---|---|
| Water | 180 |
| Butadiene | 72 |
| Styrene | 28 |
| Dresinate 214 | 4.5 |
| KOH | 0.1 |
| KCl | 0.3 |
| Tamol-N | 0.1 |
| $K_4P_2O_7$ | 0.165 |
| $FeSO_4.7H_2O$ | 0.139 |
| p-Menthanehydroperoxide | 0.095 |
| Sulfole | 0.2 |

The polymerization temperature was 41° F., and conversion was 61 percent. The rubber so prepared had a Mooney value of 69 (ML-4). The latex of the rubber prepared according to the foregoing recipe was diluted so that it contained 8.88 weight percent solids.

The following test data were obtained by separately pumping hot asphalt and the so prepared rubber latex to a mixing zone of regulated temperature. This mixing zone was a length of pipe with a throttle valve on the end. The valve discharged into a tank maintained at atmospheric pressure above the level of collected liquid therein. As the temperature of the mixing zone was maintained above the normal boiling point of water, the water flash vaporized and the asphalt-rubber mixture accumulated in the tank. The operating data follows:

| Time, Hours | Tank Temperature, °F. | Line Temperature, °F. | Pressure, p.s.i.g. | Charge Ratio, Asphalt/Latex |
|---|---|---|---|---|
| 0.1 | 350 | 210 | 0 | 0 |
| 1.16 | 340 | 310 | 120 | 11/1 |
| 1.56 | 325 | 315 | 120 | 10.8/1 |
| 1.75 | 355 | 335 | 100 | 9.1/1 |
| 2.00 | 340 | 300 | 25 | 9/1 |
| 2.25 | 340 | 310 | 25 | 9.1/1 |
| 3.00 | 335 | 290 | 25 | 10/1 |
| 3.25 | 325 | 255 | 30 | 7/1 |
| 3.50 | 340 | 330 | 25 | |

No appreciable amount of foaming resulted until the operating pressures of the blended mixture prior to flashing were reduced to values lower than steam pressure at the flashing temperature.

EXAMPLE II

Another asphalt-rubber blend employing a sample of the same asphalt and a sample of latex prepared using a recipe similar to that of Example I, was prepared. This sample was prepared according to prior art methods by slow incremental addition of the latex with stirring to melted asphalt at about 300° F., both the latex and the asphalt being at atmospheric pressure. Even though the addition of the latex was carefully controlled and added incrementally over a period of 3 hours and 45 minutes, there was still obtained troublesome foaming. Moreover, the length of time to produce the blend was longer than necessary than if there had been no foaming.

Properties of the pressure blended rubber-asphalt mixture of Example I and of the blend of Example II, as well as properties of the asphalt without any added rubber are shown in the following table. It will be seen that the blend produced according to the invention has quite superior properties, using only 3.5 weight percent rubber.

| | Example I | Example II | Asphalt Alone |
|---|---|---|---|
| Weight percent Rubber | 3.5 | 5.0 | 0.0 |
| Mooney, ML-4, Rubber | 69 | 31 | |
| Penetration, 200/60/32° F. | 19 | 23 | 16 |
| Penetration, 100/5/77° F. | 70 | 76 | 83 |
| Penetration, 50/5/115° F. | 327 | 330 | 450 |
| Softening Point, R. & B., °F. | 127 | 129 | 116 |
| Penetration Index | +0.8 | +0.7 | −0.8 |
| Temperature Susceptibility Factor | 4.40 | 4.04 | 5.42 |

The properties of the rubber-asphalt blends shown above indicate that the process of the present invention gives better dispersion of the rubber, thus obtaining more effective results for a given quantity of rubber and reducing the percentage of rubber required in the asphalt.

As will be evident to those skilled in the art, various modifications of this invention can be made or followed in the light of the foregoing disclosure and discussion without departing from the spirit or scope of the disclosure or from the scope of the claims.

I claim:

1. In a process for preparing asphalt-rubber blends, the improvement comprising the steps of forming a heated mixture of asphalt and rubber latex at a temperature above the normal boiling point of water and under sufficient pressure to maintain water in the liquid phase, and thereafter reducing the pressure of said mixture sufficiently to cause flash vaporization of the water from said mixture.

2. In a process for preparing asphalt-rubber blends, the improvement comprising the steps of forming in a first zone a heated mixture of asphalt and a latex of a rubber selected from the group consisting of natural rubber and synthetic rubber of a conjugated diene, said first zone having a temperature above the normal boiling point of water and being under sufficient pressure to maintain water in the liquid phase, and passing said mixture to a second zone of lower pressure than said first zone and sufficient to flash vaporize the water from said mixture, whereby an asphalt-rubber blend is produced while avoiding any substantial foaming.

3. A process according to claim 2 wherein said temperature of said first zone is in the range from 250 to 400° F.

4. A process according to claim 2 wherein said temperature of said first zone is in the range from 300 to 350° F.

5. A process according to claim 2 wherein said temperature of said first zone is in the range from substantially above the normal boiling point of water up to 400° F.

6. A process according to claim 2 wherein said second zone contains a liquid body of settled asphalt-rubber blend, and said mixture from said first zone is passed into said second zone above the level of said liquid body.

7. A process according to claim 2 wherein said rubber is natural rubber.

8. A process according to claim 2 wherein said rubber is a butadiene rubber.

9. A process according to claim 2 wherein said rubber is a butadiene-styrene rubber.

10. A process according to claim 2 wherein said rubber is a polybutadiene rubber.

11. A process according to claim 2 wherein said rubber is a butadiene-acrylonitrile rubber.

12. A process according to claim 2 wherein said rubber is a butadiene-2-methyl-5-vinylpyridine rubber.

13. A process according to claim 2 wherein said rubber is a polyisoprene rubber.

14. In a process for preparing asphalt-rubber blends, the improvements comprising the steps of forming in a first zone a heated mixture of asphalt and a latex of a rubber selected from the group consisting of natural rubber and synthetic rubber of a conjugated diene, said first zone having a temperature in the range from 250 to 400° F. and being under sufficient pressure to maintain water in the liquid phase, and passing said mixture to a second zone of lower pressure than said first zone and sufficient to flash vaporize the water from said mixture, said second zone containing a liquid body of settled asphalt-rubber blend and said mixture from said first zone being passed into said second zone above the level of said liquid body, whereby an asphalt-rubber blend is produced while avoiding any substantial foaming.

References Cited in the file of this patent

UNITED STATES PATENTS

| | | |
|---|---|---|
| 2,504,605 | Thomas | Apr. 18, 1950 |
| 2,686,166 | Taylor | Aug. 10, 1954 |
| 2,700,655 | Endres | Jan. 25, 1955 |
| 2,841,060 | Coppage | July 1, 1958 |